United States Patent
Chu et al.

(10) Patent No.: US 10,146,852 B1
(45) Date of Patent: *Dec. 4, 2018

(54) SEARCH RESULT CLAIMING

(71) Applicant: Google LLC, Mountain View, CA (US)

(72) Inventors: Justin Chu, Holmdel, NJ (US); David Nachum, Mountain View, CA (US); Gregory M. Marra, San Francisco, CA (US); Richard P. Klau, San Ramon, CA (US)

(73) Assignee: Google LLC, Mountain View, CA (US)

( * ) Notice: Subject to any disclaimer, the term of this patent is extended or adjusted under 35 U.S.C. 154(b) by 52 days.

This patent is subject to a terminal disclaimer.

(21) Appl. No.: 14/706,378

(22) Filed: May 7, 2015

Related U.S. Application Data

(63) Continuation of application No. 13/228,970, filed on Sep. 9, 2011, now Pat. No. 9,037,563.

(51) Int. Cl.
  *G06F 17/30* (2006.01)
  *G06Q 50/00* (2012.01)

(52) U.S. Cl.
  CPC .. *G06F 17/30598* (2013.01); *G06F 17/30106* (2013.01); *G06F 17/30864* (2013.01); *G06Q 50/01* (2013.01)

(58) Field of Classification Search
  CPC combination set(s) only.
  See application file for complete search history.

(56) References Cited

U.S. PATENT DOCUMENTS

| | | | |
|---|---|---|---|
| 7,797,635 B1 | 9/2010 | Denise | |
| 7,801,885 B1 | 9/2010 | Verma | |
| 2003/0217001 A1 | 11/2003 | McQuaide | |
| 2004/0220791 A1* | 11/2004 | Lamkin | G06F 17/30017 703/11 |
| 2007/0174304 A1 | 7/2007 | Shrufi | |
| 2008/0168134 A1* | 7/2008 | Goodman | G06F 17/30867 709/204 |
| 2008/0195586 A1* | 8/2008 | Arnold | G06F 17/30864 |
| 2008/0256093 A1* | 10/2008 | Amitay | G06F 17/30675 |
| 2009/0234814 A1* | 9/2009 | Boerries | G06F 17/30864 |
| 2010/0058202 A1 | 3/2010 | Rostom | |
| 2010/0070448 A1* | 3/2010 | Omoigui | H01L 27/1463 706/47 |
| 2010/0144323 A1 | 6/2010 | Collins | |
| 2010/0161499 A1 | 6/2010 | Holcombe | |
| 2011/0087661 A1 | 4/2011 | Quick | |
| 2011/0246520 A1* | 10/2011 | Koister | G06Q 10/101 707/771 |

(Continued)

*Primary Examiner* — Syling Yen
*Assistant Examiner* — Bao G Tran
(74) *Attorney, Agent, or Firm* — Fish & Richardson P.C.

(57) ABSTRACT

Methods, systems, and apparatus, including computer programs encoded on a computer storage medium, for receiving user input associated with a resource of a plurality of resources, storing the user input as a factor associating the resource with a user, receiving a search query, the search query identifying the user, processing data based on the search query and the factor to generate one or more search results, the one or more search results including an indicator associated with the resource, the indicator indicating that the one or more search results are associated with the user, and transmitting the one or more search results for display on a computing device.

21 Claims, 7 Drawing Sheets

(56) References Cited

U.S. PATENT DOCUMENTS

2012/0084291 A1* 4/2012 Chung .................. G06F 17/301
                                                    707/741
2014/0244761 A1   8/2014 Dale
2014/0365466 A1  12/2014 Chu

* cited by examiner

Aaron Brown, Jr - Stone Brook Electrical Contractors ☆ [This Is Me]
P.O. Box 2239, R.R. 1, Stone Brook, 1 Country Lane, Little Rapids NL ...
Stone Brook. Brown, Arron Jr. 75 George Aaron Drive , Deer Lake NL, ..
www.gs.gov.nl.ca/licenses/electrical/stonebrook_electrical_contractors.pdf
Aaron Brown - Meeting Room - meetingroom.com
Aaron Brown | theYearbook - theyearbook.com
Aaron Brown (brownaaron) on Speakup - speakup.com
All 1137 related web results - Feedback Aaron Brown, Sr. - ePlumbers - Fort Worth, Texas ☆ [This Is Me]
Email: 25 Years Experience Fort Worth, TX - ePlumbers -Aaron Brown's
Plumbing Service .... Aaron's Rocket Socket Plumbing 6200 Fort Worth ...
www.fortworth.com/theeplumbers/index.html
All 114 related web results - Feedback Kevin Aaron Brown - Aaron B (Kevin A. Brown) | MyDomain ☆ [This Is Me]
MyDomain profile for Aaron Brown. Find friends, photos, ... Status: Single;
Here for: Networking, Friends; Hometown: little rock ...
www.mydomain.com/rockclimber875

*FIG. 3B*

SEARCH RESULT CLAIMING

CROSS-REFERENCE TO RELATED APPLICATIONS

This application is a continuation of U.S. patent application Ser. No. 13/228,970, entitled "Search Result Claiming," filed Sep. 9, 2011, which is incorporated herein by reference in its entirety.

BACKGROUND

Internet search engines are capable of presenting public information about an individual in response to a query from a user. Internet search engines, however, may not be able to distinguish between individuals sharing similar identifying information (e.g., a name and/or job title). Consequently, search results presented based on such identifying information may, misleadingly, be associated with multiple individuals.

SUMMARY

This specification describes technologies relating to search results.

In general, one aspect of the subject matter described in this specification can be embodied in methods including the actions of receiving user input associated with a resource of a plurality of resources, storing the user input as a factor associating the resource with a user, receiving a search query, the search query identifying the user, processing data based on the search query and the factor to generate one or more search results, the one or more search results including an indicator associated with the resource, the indicator indicating that the one or more search results are associated with the user, and transmitting the one or more search results for display on a computing device. Other implementations of this aspect include corresponding systems, apparatus, and computer programs, configured to perform the actions of the methods, encoded on computer storage devices.

These and other implementations may each optionally include one or more of the following features. For instance, the user input is provided as an indication from the user that the resource is associated with the user; the actions further include: generating a plurality of preliminary search results, and transmitting the plurality of preliminary search results for display, wherein the indicator is included in the plurality of search results, and the user input is generated based on the plurality of preliminary search results; the actions further include: generating a plurality of elements, each element corresponding to a preliminary search result of the plurality of preliminary search results, and transmitting the plurality of elements for display with the plurality of preliminary search results, wherein the user input is received in response to user action to an element corresponding to the indicator; the plurality of preliminary search results is provided for display in a search results editing page of a social networking service; the search results editing page of the social networking service is associated with a user profile of the user within the social networking service; the actions further include determining that the user is logged into a user profile, wherein the factor associates the resource with the user profile; the actions further include: comparing data of the resource to data of the user profile, and determining that at least one data of the resource is identical to at least one data of the user profile, wherein storing the user input as a factor associating the resource with a user occurs in response to determining; the at least one data of the resource and the at least one data of the user profile comprise an email address; the actions further include receiving user input defining an order of search results, wherein the one or more search results further include a plurality of indicators, the plurality of indicators including the indicator, and the plurality of search results being transmitted for display in the order of search results; the one or more search results are provided in a plurality of clusters, at least one cluster of the plurality of clusters corresponding to the user; the actions further include modifying the at least one cluster based on the indication from the user that a presented search result is associated with the user; and the user input includes a uniform resource indicator (URI) that is embedded in the resource, the URI providing a link to another resource of the plurality of resources.

Particular implementations of the subject matter described in this specification can be implemented so as to realize one or more of the following advantages. People clustering accuracy can be improved using data gathered from user search result claiming. Users can also gain influence and a sense of control through the act of claiming search results, and further through adding, editing, and/or curating search results associated with themselves on a profile.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 3A and 3B show an example search results page including clustered people search results.

Like reference numbers and designations in the various drawings indicate like elements.

DETAILED DESCRIPTION

Users can search for particular individuals by submitting a query, including a particular identifier, to a search system. The identifier can be a name, e.g., "Nicolas Sarkozy" or other identifier associated with an individual, for example, "president of France." Presented search results can include results associated with one or more individuals. These results can be clustered according to each particular individual based on one or more clustering techniques. In addition to search results, other metadata associated with the search results can be provided including pictures, keywords or other personally relevant information for the identified individual.

Implementations of the present disclosure include methods and systems for allowing users to add, edit, and/or curate search results associated with themselves. For example, in some implementations, the methods and systems described herein enable users to claim and/or disclaim one or more search results as being associated with themselves. Claimed search results may be displayed on a user profile and/or used to compute search result clusters.

Figure 1:
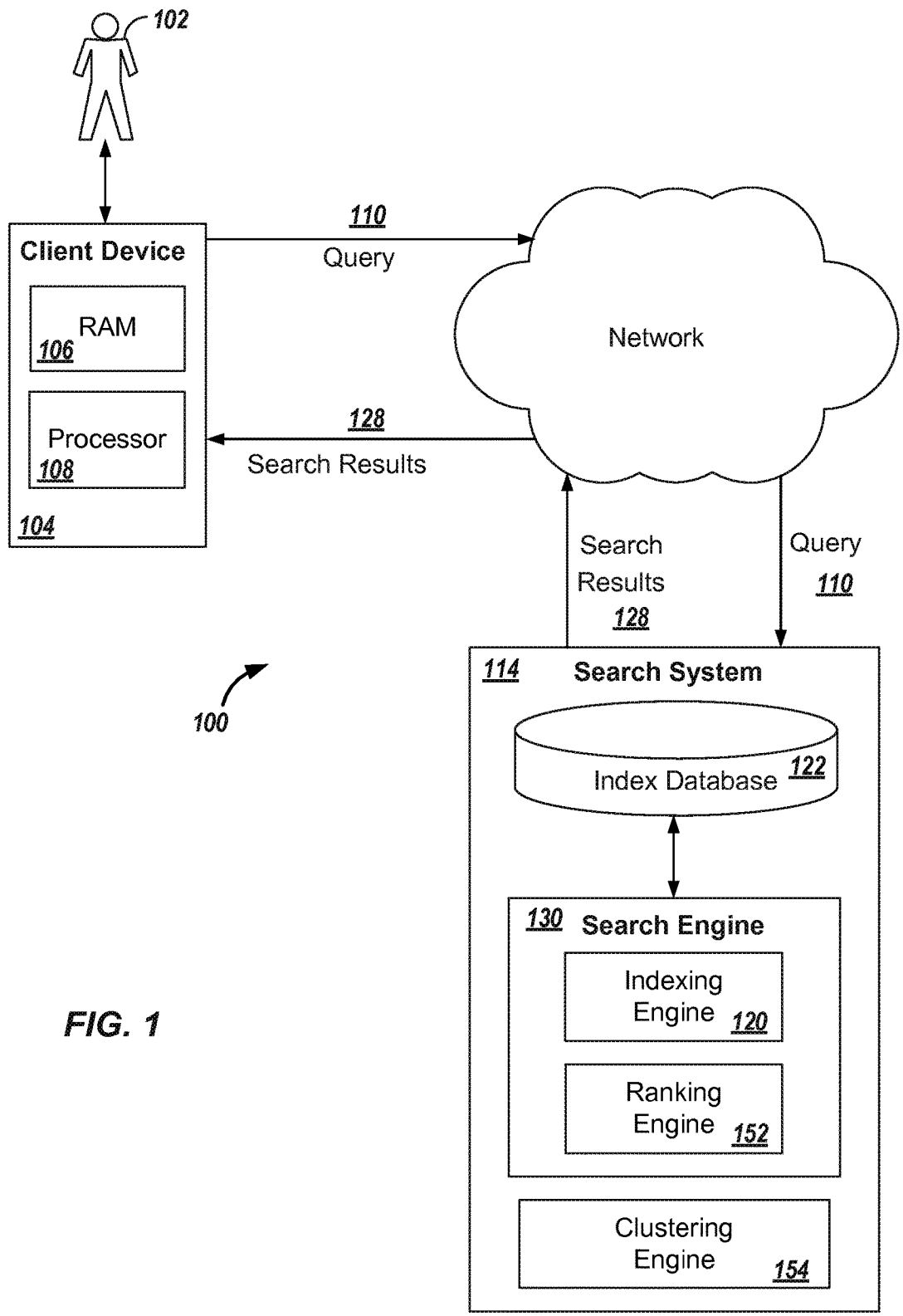
FIG. 1 shows an example system.

FIG. 1 shows an example system 100. The system 100 provides search results relevant to submitted queries as can be implemented in the Internet, an intranet, or another client and server environment. The system 100 is an example of an information retrieval system in which the systems, components, and techniques described below can be implemented.

A user 102 can interact with a search system 114 through a client device 104. For example, the client device 104 can be a computing device coupled to the search system 114 through a local area network (LAN) or wide area network (WAN), e.g., the Internet. In some implementations, the search system 114 and the client device 104 can be one machine. For example, a user can install a desktop search application on the client device 104. The client device 104 will generally include a random access memory (RAM) 106 and a processor 108.

The client device 104 can include any type of computing device such as a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices. The search system 114 can include one or more server systems.

A user 102 can submit a query 110 to a search engine 130 within the search system 114. When the user 102 submits a query 110, the query 110 is transmitted through a network to the search system 114. The search system 114 can be implemented as, for example, computer programs running on one or more computers (e.g., servers) in one or more locations that are coupled to each other through a network. In some implementations, the search system 114 includes an index database 122 and the search engine 130. The search system 114 responds to the query 110 by generating search results 128, which are transmitted through the network to the client device 104 in a form that can be presented to the user 102 (e.g., as a search results web page to be displayed in a web browser running on the client device 104).

When the query 110 is received by the search engine 130, the search engine 130 identifies resources that match, or are responsive to the query 110. The search engine 130 will generally include an indexing engine 120 that indexes resources (e.g., web pages, images, or news articles on the Internet) found in a collection of content, an index database 122 that stores the index information, and a ranking engine 152 (or other software) to rank the resources that match the query 110. The indexing and ranking of the resources can be performed using conventional or other techniques. In some implementations, the search system 114 also includes a clustering engine 154 to cluster resources according to individuals. For example, in some implementations, the clustering engine 154 may be a physical or virtual component of the search engine 130. Cluster identifiers can be included in the index database 122 or in a separate index, not shown. In some implementations, cluster identifiers can be identified at runtime. The search engine 130 can transmit the search results 128 through the network to the client device 104 for presentation to the user 102.

The search system 114 can also receive user input for editing and curating search results, as discussed in further detail herein. For example, a user desiring to edit search results associated with themselves can provide user input to the search system 114. The search system 114 can selectively modify or adapt search results based on the user input. For example, and as discussed in further detail below, a particular user can claim search results as being associated with themselves. In this manner, and in response to receiving a subsequent search query associated with the particular user, the claimed search results can be displayed as being associated with the particular user. To that end, the search system 114 can execute the functionality discussed in further detail herein.

Figure 2:
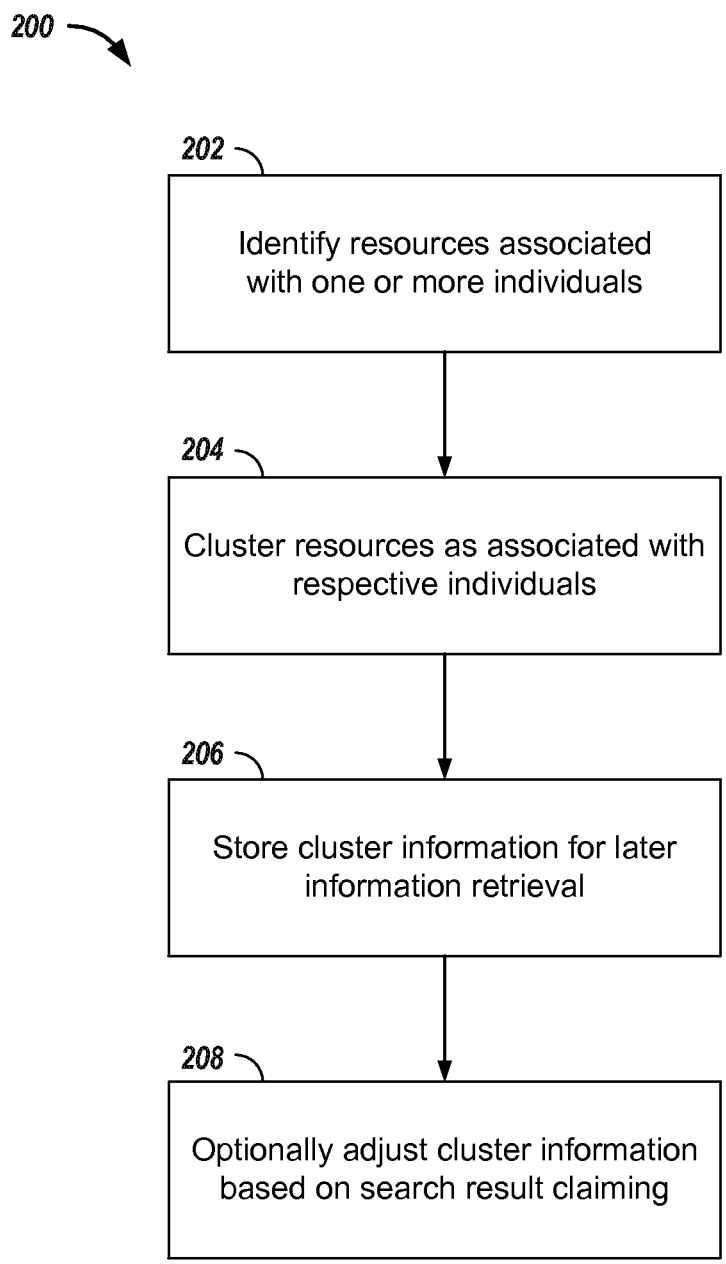
FIG. 2 is a flow diagram of an example process for people clustering.

FIG. 2 is a flow diagram of an example process 200 for people clustering. For convenience, the process 200 will be described with respect to a system including one or more computing devices that performs the process 200. An example system can include the system 100 of FIG. 1.

The system identifies resources associated with one or more individuals (202). Resources can be identified, for example, by searching an index of resources, for example, index database 122 described above with respect to FIG. 1. In some implementations, a separate index can be generated that indexes resources associated with individuals. Resources can be associated with individuals, for example, based on the individuals names occurring in resource content or metadata associated with resources. In some implementations, particular types of resources are associated with individuals, for example, user profiles (e.g., from social groups, businesses, or schools), user blogs, or images from image sharing sites.

The system clusters resources as associated with respective individuals (204). Various clustering techniques can be used to cluster resources. In some implementations, a simple clustering can initially group resources associated with the same name. For example, all resources associated with the name "John Smith" can be clustered together. In some implementations, variations in a name are allowed during clustering. For example, resources associated with "John Smith" can be clustered with resources associated with "John A. Smith." Similarly, spelling variations can influence which resources are clustered together or are treated as separate clusters, e.g., "John Smith" and "John Smyth."

Other clustering techniques can attempt to parse separate individuals who may share the same name so that each individual has an associated cluster of resources purportedly associated with that individual. For example, particular features of the resources can be used to attempt to identify particular individuals even if they have the same name. These features can identify, for example, links, name mentions, rare word mentions (e.g., words appearing with a low frequency in a search corpus) that can be used to identify particular resources associated with the same individual. For example, the fact that two or more resources contain web links pointing to one another may be considered an indication that the resources are associated with the same individual. In this way, users can alter the cluster of resources associated with themselves by providing web links between the resources.

In some implementations, the system receives a set of clustering information (e.g., a clustering index) that has been previously generated. This index can include clusters and resources associated with each respective cluster.

The system stores cluster information for later information retrieval (206). Cluster information can be stored, for example, in a separate index database or table. In some implementations, each cluster has an associated cluster identifier. The cluster identifier is associated with resources that are members of the cluster. For example, the database or table can be keyed to the cluster identifier and/or identifying resources in the cluster. An identifying resource may be a resource in the cluster that can be used to identify other resources in the cluster (e.g., a user profile including links or pointers to other resources associated with the user). In some implementations, the index database includes a field for cluster identifiers so that when resources are identified in response to a search query, any associated cluster identifiers can also be identified. In some implementations, cluster information is stored in both an index database and a cluster database. For example, the index database can be annotated with cluster identifiers (e.g., an indexed web page can have one or more cluster identifiers associated with it). The cluster database can maintain cluster keyed information that also includes metadata identifiers (e.g., keywords, photo references, etc.). In some examples, cluster keyed information can include any appropriate information regarding a cluster (e.g., images corresponding to the cluster, keywords corresponding to the cluster, popular hyperlinks corresponding to the cluster).

The system can adjust cluster information based on search result claiming (208), as discussed in further detail herein. Search result claiming may include both claiming and disclaiming search results. In some implementations, clusters are periodically recomputed. In some implementations, clusters are recomputed based on the number of search results claimed by a user. In some implementations, clusters are continuously adjusted as search results are claimed by users. In some implementations, clusters are adjusted differently for different users. For example, clusters may be recomputed more readily based on search result claiming from a trusted user (e.g., a user whose identity can be verified) than an untrusted user (e.g., a user whose identity can not be verified or a new user). Additionally, search result claiming may be weighted in cluster computations based on a reputation score of the user (e.g., a measure of how reliable the user's search result claiming is). In some examples, a reputation score of a user can be determined based on a number of inbound hyperlinks to the profile of the user, a number of verified, authenticated and/or connected accounts that the user has, the age the account and/or the activeness of the account. In some examples, the reputation score can be based on how many disreputable accounts the user is connected to, what types of content the user links to (e.g., users that often link to spam websites), and/or the quality and the frequency of user interactions.

In some implementations, users can claim any presented search results (in some other examples, only certain presented search results may be claimed). The claimed search results can be processed according to various criteria. In some implementations, the clustering information can be adjusted in response to one or more claimed search results. For example, if search result claiming indicates that a search result is not associated with the cluster for a particular individual (e.g., disclaiming the search result), the cluster information can be adjusted such that the search result is no longer clustered with the individual. For example, various weights in the clustering process (e.g., weights to a particular feature) can be adjusted such that the search result is demoted relative to the individual of the cluster. In another example, search result claiming may indicate that individuals identified in two different clusters are actually the same individual. As a result, the two clusters can be joined into a single cluster for the individual. Additionally, new features can be generated based on search result claiming.

Figure 3A:
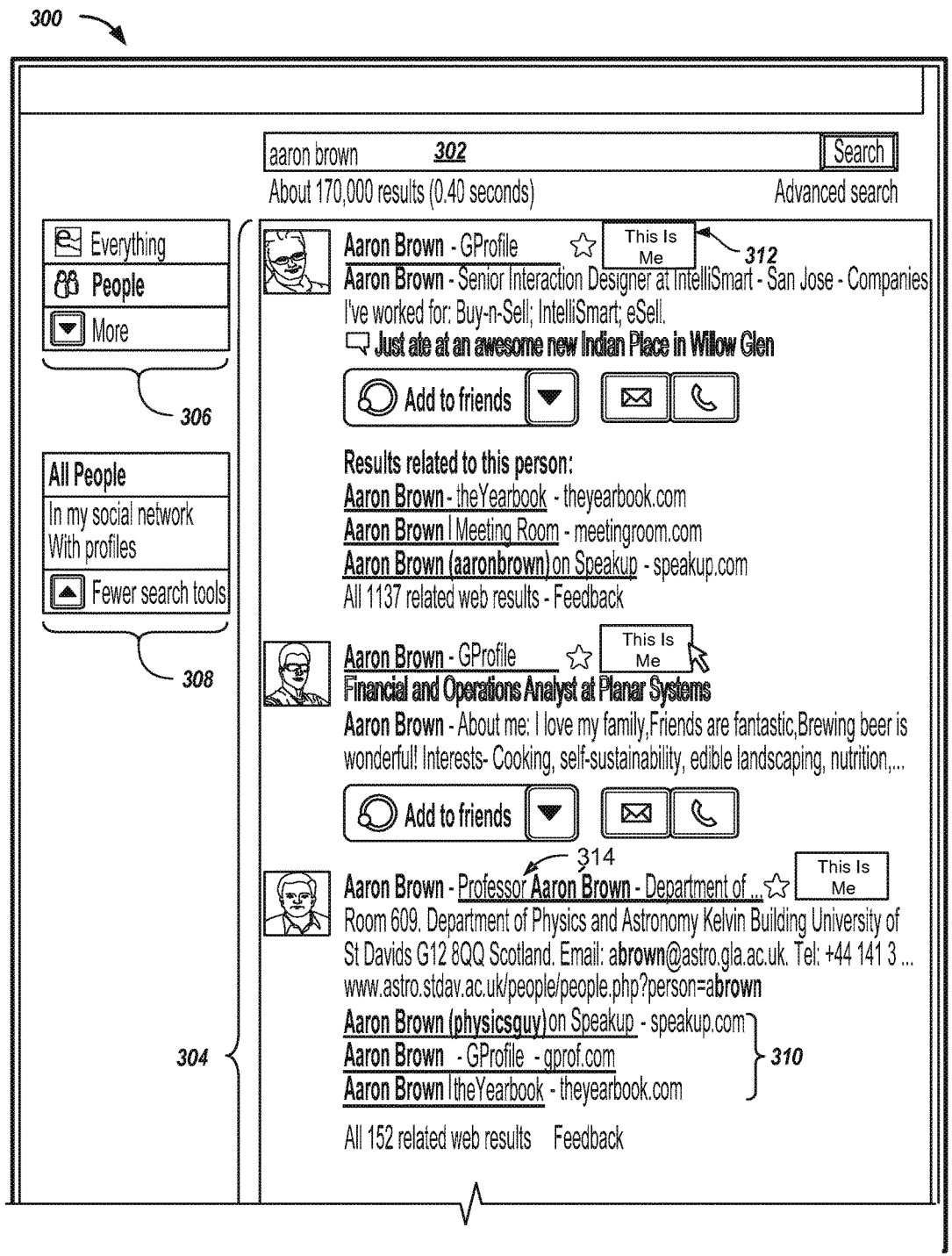

FIGS. 3A and 3B show an example search results page 300 including clustered search results associated with identified individuals ("people search results"). Search results page 300 represents a search results page presented to a user after entering a query into a search interface. In some implementations, user input can further include selection of a search results filter, such as a "people" filter for the search results. In particular, as illustrated in the search results page 300, the search query is shown in a search field 302. People search results 304 are presented in response to a selection of "people" from result filters 306. The result filters 306 enable the user to designate between search results limited to people only, general search results responsive to the query, or other refinements. Results limited to people, for example, can be a subset of search results retrieved in response to the query. The limited subset of search results may only include particular types of content associated with the individual(s) identified in the search query. For example, search results directed to types of content such as search results for personal profiles and social accounts can be presented in a people search, but not search results for books or documents that simply refer to a name identified in the search query in a non-related context (e.g., a fictional book referring to a character having the same name as the individual identified in the search query).

The people search results 304 include particular search results (e.g., a search result including a link to a resource and a snippet of content associated with the resource). For example, search result 314 identifies a faculty profile for a particular individual. The people search results 304 also include clustered search results 310. The clustered search results 310 are search results in the same cluster (e.g., identified using a cluster identifier associated with each search result). Additional search results of the cluster can be displayed in response to a user request, e.g., a user selection of the link "all 152 related web results."

A claiming element corresponding to each displayed cluster of search results can be provided. Selecting the claiming element 312 enables the user to indicate that the corresponding cluster contains information associated with the user. An example claiming element can include an icon that is displayed adjacent to a respective search result, and which is actionable (e.g., can be clicked on) to generate user input indicating that the user is claiming the particular search result as being associated with them. In some implementations, claiming elements 312 may be provided for claiming individual search results. Further, in some examples, claiming elements 312 can be provided in any type of search result pages (both filtered and non-filtered), thereby enabling users to perform search result claiming during routine searches. In some implementations, search results 304 are ranked in part based on a social connection to the requesting user such that search results associated with users having a connection to the requesting user are positioned higher than search results associated with users having no connection to the requesting user.

Additionally, as shown in search results page 300, other filtering options are available. For example, scope filter 308 enables the user to filter based on the user's relationship with the individuals identified in the search results. For example, all people can be shown, or only those having a relationship or connection to the user. In some implementations, only search results of individuals having profiles are presented. In some implementations, even when all people are presented, the presentation of search results can promote search results associated with individuals that the user has a relationship with (e.g., as a ranking weight applied to those individuals connected to the user).

In some implementations, the user inputting the query can have an electronically stored profile that can be associated with a search service providing the search tools. The user inputting the search query (e.g., "aaron brown") can be logged into the search service, while performing searching activities. In response to user input to a claiming element 312, the system can determine whether to associate the claimed search result with the user profile. For example, the system can evaluate the trustworthiness of the user based on data associated with the user profile. If the system deems the user to be sufficiently trustworthy (e.g., the user is who (s)he says (s)he is), the system can associate the user profile and the search result.

In some implementations, the system can evaluate the trustworthiness of the user based on data associated with the user profile and data associated with the particular search result. For example, if data associated with the user profile sufficiently overlaps with data associated with the particular search result, the system can determine that the user profile is associated with the search result and, therefore, the user profile and the search result can be associated. By way of non-limiting example, a user profile and a search result can each include name data, email address data, and data identifying one or more social networks a user is a member of. If the name data, email address data and social network data of the user profile is the same as or is sufficiently similar to the name data, email address data and social network data of the search result, the system can determine that the search result is associated with the user profile. If, for example, the name data and social network data of the user profile is the same as or is sufficiently similar to the name data and social network data of the search result, but the email address data is not the same, the system can determine that the search result is not associated with the user profile. In this case, the system may not associate the user profile and the search result even though the user has claimed the search result by clicking on a corresponding claiming element 312.

In some implementations, an individual user may establish a user profile that is usable with a search result editing and curating tool. By way of non-limiting example, the user profile can include a profile within a network service (e.g., a social networking service), which network service provides one or more search result editing and curating tools. When the user is logged into the social networking service, the user can access the search result editing and curating tool to add, edit, and/or curate search results that are to be associated with the user profile. The user profile may include one or more entries containing personal and/or professional information about the user. Profile entries can be provided by the user and/or generated automatically by a computing system. Suitable profile entries may include, but are not limited to, contact information (e.g., telephone number(s), physical address, email address, etc.), financial information, demographic information, relationship status, political views, career information, search results, etc.

Figure 4:
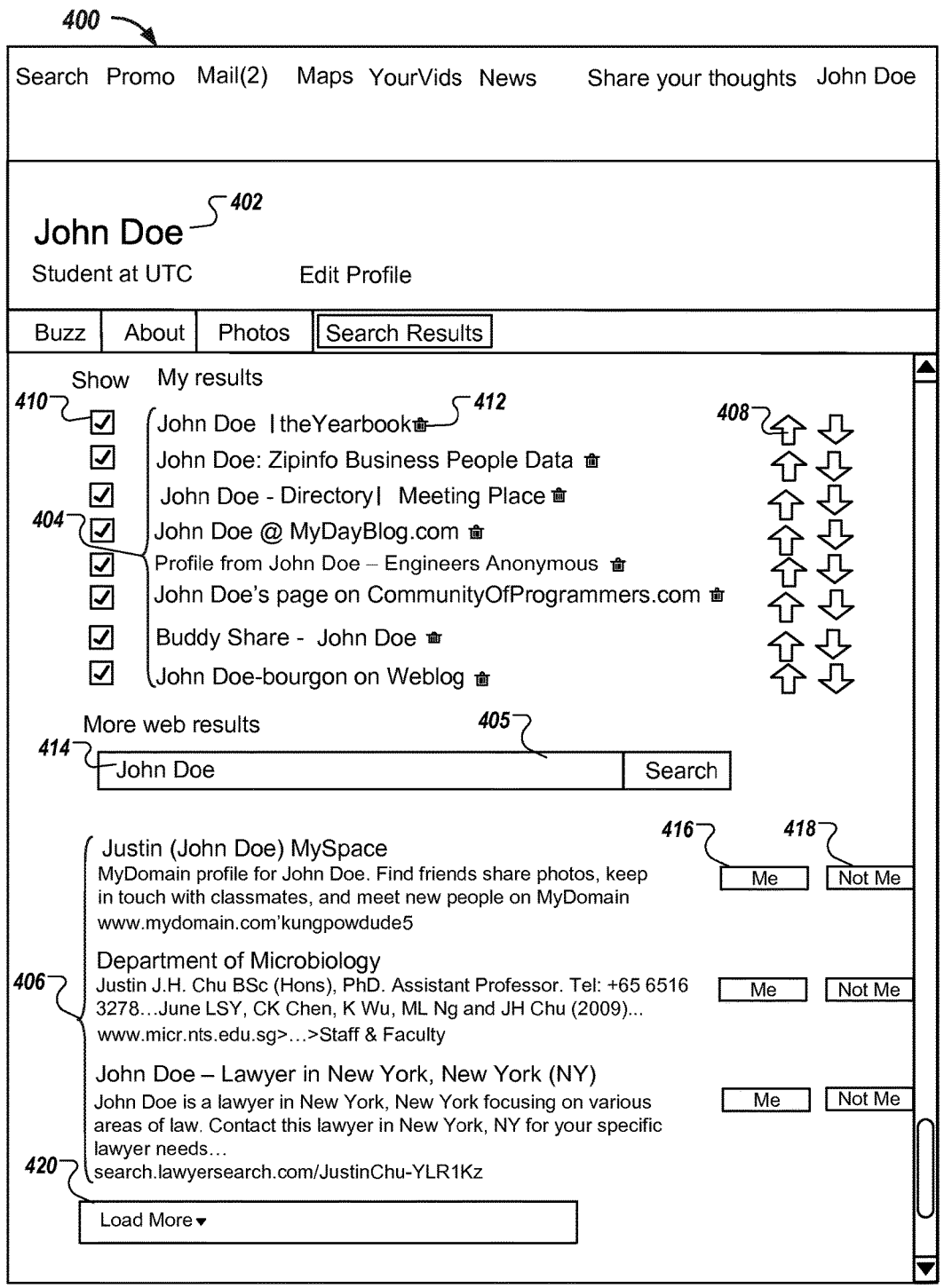
FIG. 4 is an illustration of a user profile editing page displaying search results that can be curated by a user.

FIG. 4 is an illustration of an example user profile editing page 400. The example profile editing page 400 can be provided in the context of a network service (e.g., an email service and/or a social networking service provided by a service provider) and enable a user to perform editing operations on profile entries (e.g., adding, deleting, and/or amending entries). In some examples, profile editing pages may only be accessed by a profile manager (e.g., the user whose identity is represented by the profile). The entries can include search results (e.g., clustered people search results) associated with profile manager 402. For example, as shown, profile page 400 can display a first set of search results 404 and a second set of search results 406. In some implementations, the first set of search results includes a set of search results previously claimed by profile manager 402 (for example, using claiming element 312 is described with reference to FIG. 3, and/or other means as discussed further below). Claiming a search result may be considered as an indication by the user that the particular search result contains information associated with the user.

In some implementations, profile editing page 400 may include one or more options for editing claimed search results (e.g., search results 404). For example, as shown, profile editing page 400 includes ranking elements 408, display option elements 410 (e.g., show/hide options), and disclaim elements 412 for each of search results 404. Ranking elements 408 may allow the profile manager to rank the claimed search results on the profile. For example, a user may rank claimed search results by relevance or importance (or in any other manner). As shown, ranking elements 408 are provided in the form of clickable, or otherwise user-selectable arrow buttons. Selecting the upward arrow corresponding to a search result may move the search result up one or more positions in the ranking order. Similarly, selecting the downward arrow may move the search result down one or more positions in the ranking order. In some implementations, the search results can be dragged and dropped in a desired position in the ranking order. A subsequent search can include search results associated with the profile manager 402, which search results can include the search results 404 as defined and ordered by the profile manager. For example, a third-party can enter the keywords "John Doe" as a query to a search engine, and the search results provided back to the third-party can include the search results 404 in the order defined using the profile editing page 400.

Display elements 410 enable the profile manager to show or hide claimed search results on the profile. As shown display elements 410 are provided in the form of a selectable toggle option. In this example, the check-marked box indicates that the search result will be displayed to other users searching the user name associated with the profile (e.g., "John Doe"). Disclaim elements 412 (shown in this example as a trashcan icon) enable the profile manager to indicate that the corresponding search result is not associated with the user. For example, a user may have previously claimed a search result by mistake or may no longer be mentioned at the destination of the link. Thus, selecting any of disclaim elements 412 may remove the corresponding search result from the list of search results 404.

In some implementations, the second set of search results (i.e., search results 406) is provided to enable the user to find more potential search results about themselves. In this example, search results 406 represent the search results presented to profile manager 402 after entering a query 414 (e.g., the user's name) into a search interface 405. In some implementations, the search results presented as a result of the query include a cluster of people search results, provided as discussed above. A selected number of such search results may be presented to the profile manager 402 for claiming. For example, the ten most highly ranked search results of the cluster may be presented to the profile manger 402. In some other implementations, search results 406 are provided based on search results that have previously been claimed by the profile manager 402. For example, search results 406 may include search results in the same cluster as one or more of claimed search results 404.

In some implementations, profile editing page 400 may further include one or more options for adding additional search results to the list of claimed search results (e.g., search results 404). For instance, in this example, claiming elements 416 and disclaiming elements 418 are provided for each of search results 404. Claiming elements 416 enable the user to indicate that the corresponding search result is associated with the user. Similarly, disclaiming elements 418 enable the user to indicate that the corresponding search result is not associated with the user. In some implementations, search results claimed by selecting one of more of claiming elements 416 may be added to the list of search results 404. Search results disclaimed by the user may be removed from the profile completely. In certain implementations, an option to ignore search results may be provided. Ignored search results may remain in the list of search results 406 or may be temporarily removed from the list. In some examples, previously claimed or disclaimed search results will not be retrieved in future searches. The user may also load additional search results based on the query 414 by selecting option 420.

Figure 5:
FIG. 5 is an illustration of a user profile viewing page displaying curated search results.

FIG. 5 is an illustration of a user profile viewing page 500 displaying search results 502. Profile viewing pages may be available to any user, but may not allow viewing users to edit or otherwise alter profile entries. Displayed search results 502 may represent search results claimed by profile manager 504. In some implementations, search results 502 are presented to users viewing the profile as curated by the profile manager. The search results 502 include search results 404 of FIG. 4 that are selected to be displayed by the user (e.g., by checking a corresponding display element 410), and are provided in the order as defined by the user (e.g., using ranking elements 408). The user profile viewing page displays the search results 502 as they would appear to a third-party using a search engine. In this manner, the user can view how search results associated with him/her would appear to other users, and can use the profile editing page 400 to edit and curate the content and appearance of search results to third-parties.

Figure 6:
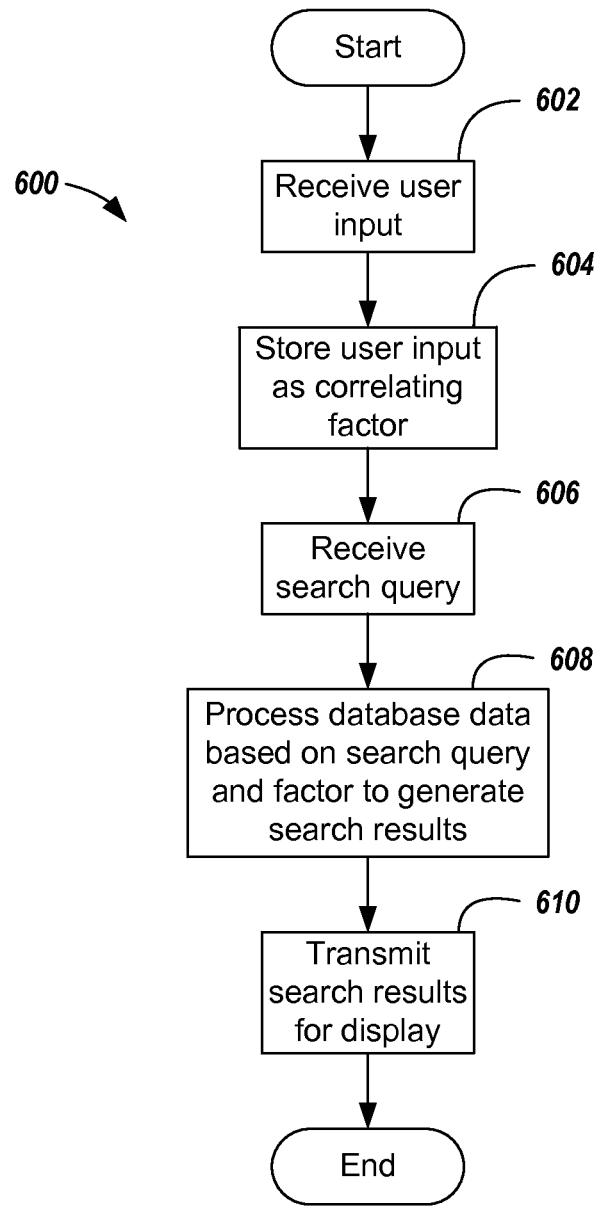
FIG. 6 is a flow diagram of an example process for curating user search results.

FIG. 6 is a flow diagram of an example process 600 for curating user search results. User input relating to a resource of a plurality of resources is received (602). For example, the search system 114 of FIG. 1 can receive user input from a particular user, which user input indicates that the particular user is claiming the resource as being associated with them. The user input is stored in computer-readable memory as a factor associating the resource with a user (604). For example, the search system 114 of FIG. 1 can store the user input as a factor associating the resource with the particular user. The factor may include any form of data that can be used in determining whether the resource should be associated with or disassociated from an individual and/or to what degree the resource should be associated with the individual. For example, the factor may be used in cluster computation (e.g., as a weight in the clustering process), as described above.

A search query is received (606), the search query identifying the user. For example, the search system 114 of FIG. 1 can receive the search query. In some implementations, a searching user can submit the search query to search for resources associated with the user. Data stored in a database is processed based on the search query and the factor to generate one or more search results (608). For example, the search system 114 of FIG. 1 can process data stored in a database (e.g., index database 122) based on the search query and the factor to generate search results. The one or more search results are transmitted for display on a computing device (610). For example, the search system 114 of FIG. 1 can transmit the search results for display.

In some implementations, a user can passively associate web-based content to themselves. Consequently, the web-based content can appear in search results and can be clustered to the associated user. For example, a user may be associated with a first resource (e.g., a first website) and a second resource (e.g., a second website). In the first website, the user can insert a hypertext link (e.g., including a uniform resource indicator (URI)) to the second website. A system, such as the search system 114 can associate the particular user with one of the first website and the second website. For example, the search system can associate the first website with the user based on relevant information, as discussed above. Because the user has inserted a link to the second website within the first website, the search system can determine that the second website is associated with the user. In some implementations, the existence of the link to the second website within the first website can be processed by the search system as one factor among a plurality of factors in determining whether the second website indeed corresponds to the user.

In some implementations, the first website can include a link to the second website, and the second website can include a link to the first website. In some implementations, the search system can definitively establish that both the first website and the second website are associated with the user. In some implementations, the existence of cross-referencing links can be processed by the search system as one factor among a plurality of factors in determining whether the second website is indeed associated with the user.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system, comprising:
one or more processors; and
a non-transitory computer-readable medium coupled to the one or more computers having instructions stored thereon which, when executed by the one or more computers, cause the one or more computers to perform operations comprising:
    receiving a search query from a user device;
    providing, based on the search query and by a search service, a first set of search results for display on a user profile page that is associated with a particular user, wherein each of one or more of the search results is a search result for an individual person and includes information identifying the individual person, the information identifying the individual person being responsive to the search query, and, based on the search result being for an individual person, is associated with a respective selectable claiming element;
    receiving user input of a selection of a particular claiming element associated with a particular search result of the one or more search results, the user input being provided through the user profile page, the user input comprising a claim by the particular user that a resource associated with the particular search result includes information that corresponds to the particular user, the user input received from the user device;
    identifying metadata associated with the resource, the metadata including contact information identifying one or more users associated with the resource;
    identifying a search service profile of the particular user, the search service profile identifying the particular user within the search service that provides the first set of search results, the search service profile including contact information of the particular user;
    in response to receiving the user input, comparing the contact information associated with the resource with the contact information associated with the search service profile of the particular user;
    based on the comparing, matching at least a portion of the contact information of the metadata associated with the resource with a portion of the contact information associated with the search service profile to determine that the particular user is one of the one or more users and that the resource is associated with the particular user; and
    in response to the matching, storing, in computer-readable memory, the user input as a factor associating the resource with the particular user.

2. The system of claim 1, the operations further comprising:
    updating the first set of search results based on the factor to generate an updated set of search results, wherein one or more search results of the updated set of search results includes a respective indicator, the indicator indicating that the corresponding search result of the updated set of search results is associated with the particular user; and
    transmitting the updated set of search results for display on a computing device associated with the particular user.

3. The system of claim 2, the operations further comprising:
    receiving additional user input defining an order of the first set of search results,
    wherein the updated set of search results further comprise a plurality of indicators, the plurality of indicators including the indicator, and the updated set of search results being transmitted for display in the order.

4. The system of claim 2, wherein the updated set of search results are provided in a plurality of clusters, at least one cluster of the plurality of clusters corresponding to the particular user.

5. The system of claim 4, the operations further comprising:
    periodically modifying the clusters based on a number of search results that are claimed by users, wherein each claiming of a search result is an indication from a particular user that the resource associated with the particular search result is associated with the particular user.

6. The system of claim 1, wherein the search query identifies the particular user that provided the search query.

7. The system of claim 1, wherein providing the first set of search results further comprises:
    generating a plurality of elements, each element corresponding to a search result of the first set of search results; and
    transmitting the plurality of elements for display with the first set of search results.

8. The system of claim 1, wherein the search service profile includes a search results editing page of a social networking service.

9. The system of claim 1, wherein the contact information includes an email address.

10. A non-transitory computer storage medium encoded with a computer program, the program comprising instructions that when executed by one or more computers cause the one or more computers to perform operations comprising:
    receiving a search query from a user device;
    providing, based on the search query and by a search service, a first set of search results for display on a user profile page that is associated with a particular user, wherein each of one or more of the search results is a search result for an individual person and includes information identifying the individual person, the information identifying the individual person being responsive to the search query, and, based on the search result being for an individual person, is associated with a respective selectable claiming element;
    receiving user input of a selection of a particular claiming element associated with a particular search result of the one or more search results, the user input being provided through the user profile page, the user input comprising a claim by the particular user that a resource associated with the particular search result includes information that corresponds to the particular user, the user input received from the user device;

identifying metadata associated with the resource, the metadata including contact information identifying one or more users associated with the resource;

identifying a search service profile of the particular user, the search service profile identifying the particular user within the search service that provides the first set of search results, the search service profile including contact information of the particular user;

in response to receiving the user input, comparing the contact information associated with the resource with the contact information associated with the search service profile of the particular user;

based on the comparing, matching at least a portion of the contact information of the metadata associated with the resource with a portion of the contact information associated with the search service profile to determine that the particular user is one of the one or more users and that the resource is associated with the particular user; and in response to the matching, storing, in computer-readable memory, the user input as a factor associating the resource with the particular user.

11. The computer storage medium of claim 10, the operations further comprising:

updating the first set of search results based on the factor to generate an updated set of search results, wherein one or more search results of the updated set of search results includes a respective indicator, the indicator indicating that the corresponding search result of the updated set of search results is associated with the particular user; and transmitting the updated set of search results for display on a computing device associated with the particular user.

12. The computer storage medium of claim 11, the operations further comprising:

receiving additional user input defining an order of the first set of search results, wherein the updated set of search results further comprise a plurality of indicators, the plurality of indicators including the indicator, and the updated set of search results being transmitted for display in the order.

13. The computer storage medium of claim 11, wherein the updated set of search results are provided in a plurality of clusters, at least one cluster of the plurality of clusters corresponding to the particular user.

14. The computer storage medium of claim 13, the operations further comprising:

periodically modifying the clusters based on a number of search results that are claimed by users, wherein each claiming of a search result is an indication from a particular user that the resource associated with the particular search result is associated with the particular user.

15. The computer storage medium of claim 10, wherein the search query identifies the particular user that provided the search query.

16. The computer storage medium of claim 10, wherein providing the first set of search results further comprises:

generating a plurality of elements, each element corresponding to a search result of the first set of search results; and transmitting the plurality of elements for display with the first set of search results.

17. A computer implemented method for user search result claiming, the method comprising:

receiving a search query from a user device;

providing, based on the search query and by a search service, a first set of search results for display on a user profile page that is associated with a particular user, wherein each of one or more of the search results is a search result for an individual person and includes information identifying the individual person, the information identifying the individual person being responsive to the search query, and, based on the search result being for an individual person, is associated with a respective selectable claiming element;

receiving user input of a selection of a particular claiming element associated with a particular search result of the one or more search results, the user input being provided through the user profile page, the user input comprising a claim by the particular user that a resource associated with the particular search result includes information that corresponds to the particular user, the user input received from the user device;

identifying metadata associated with the resource, the metadata including contact information identifying one or more users associated with the resource;

identifying a search service profile of the particular use, the search service profile identifying the particular user within the search service that provides the first set of search results, the search service profile including contact information of the particular user;

in response to receiving the user input, comparing the contact information associated with the resource with the contact information associated with the search service profile of the particular user;

based on the comparing, matching at least a portion of the contact information of the metadata associated with the resource with a portion of the contact information s-associated with the search service profile to determine that the particular user is one of the one or more users and that the resource is associated with the particular user; and in response to the matching, storing, in computer-readable memory, the user input as a factor associating the resource with the particular user.

18. The method of claim 17, further comprising:

updating the first set of search results based on the factor to generate an updated set of search results, wherein one or more search results of the updated set of search results includes a respective indicator, the indicator indicating that the corresponding search result of the updated set of search results is associated with the particular user; and transmitting the updated set of search results for display on a computing device associated with the particular user.

19. The method of claim 18, further comprising:

receiving additional user input defining an order of the first set of search results, wherein the updated set of search results further comprise a plurality of indicators, the plurality of indicators including the indicator, and the updated set of search results being transmitted for display in the order.

20. The method of claim 19, further comprising periodically modifying the clusters based on a number of search results that are claimed by users, wherein each claiming of a search result is an indication from a particular user that the resource associated with the particular search result is associated with the particular user.

21. The method of claim 17, wherein the updated set of search results are provided in a plurality of clusters, at least one cluster of the plurality of clusters corresponding to the particular user.

* * * * *